(No Model.) 2 Sheets—Sheet 2.
H. WESTPHAL.
BICYCLE RACK.
No. 565,057. Patented Aug. 4, 1896.
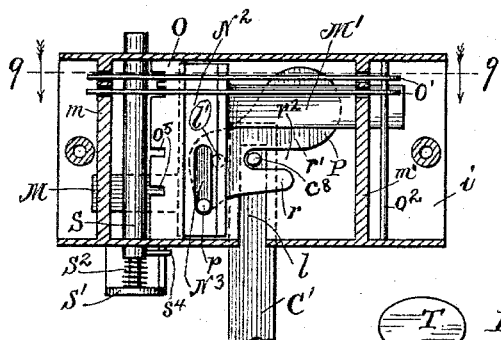
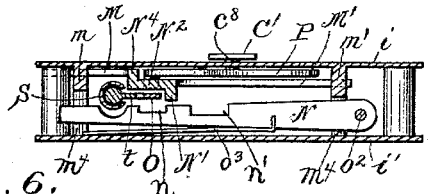
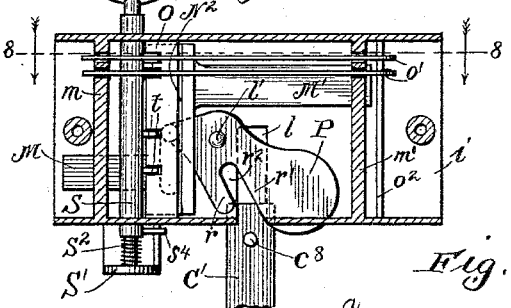
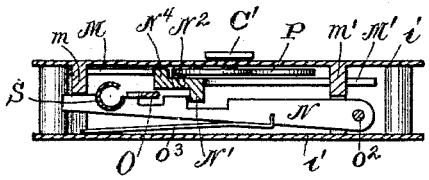
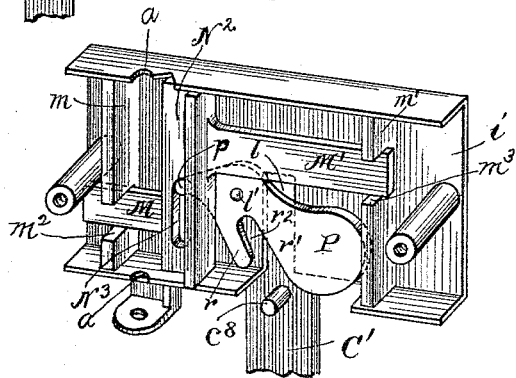
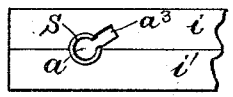
Witnesses:
W. J. Jacker.
O. A. Duggan.
Inventor:
Henry Westphal
By Chas. C. Tillman
Atty.

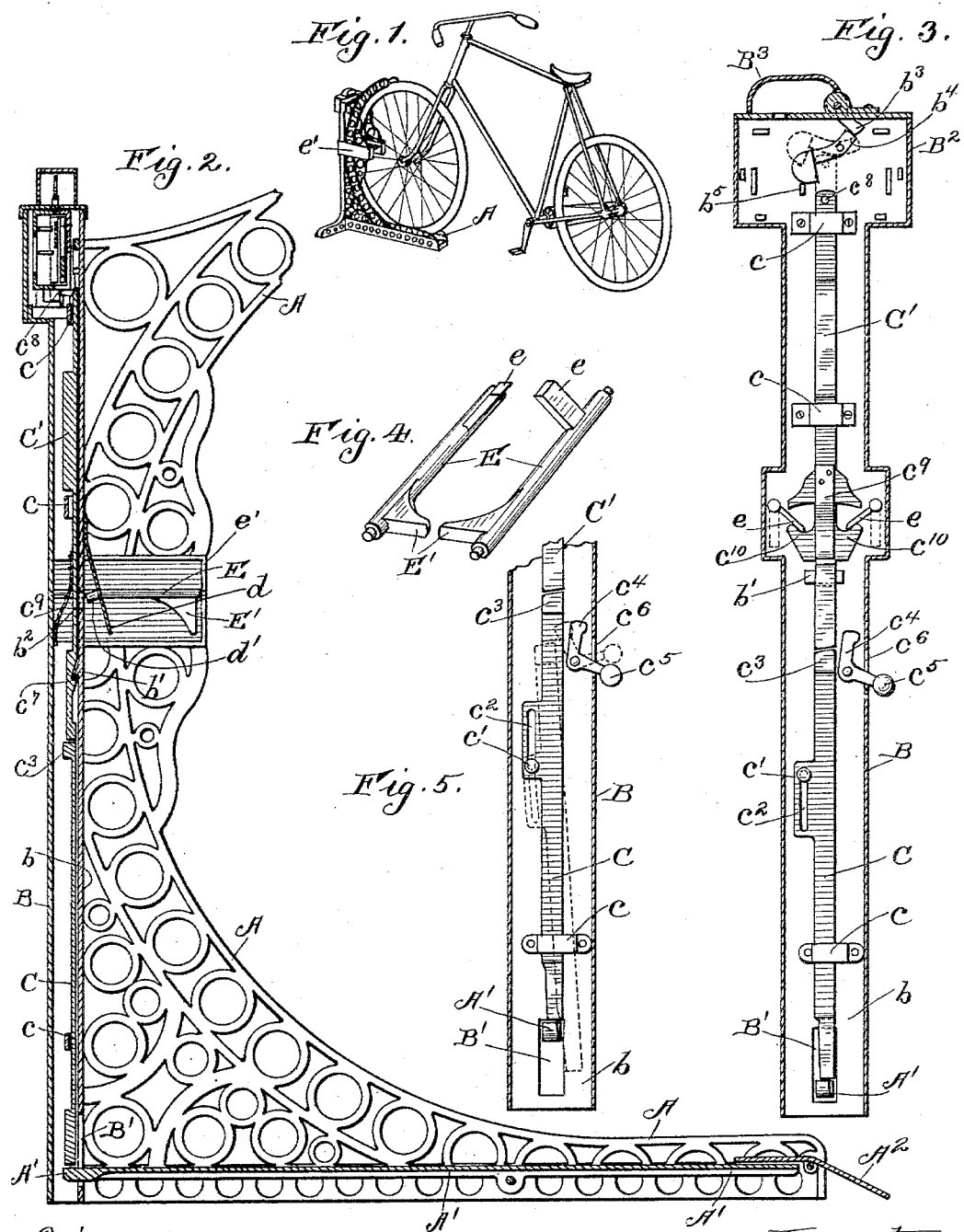

UNITED STATES PATENT OFFICE.

HENRY WESTPHAL, OF CHICAGO, ILLINOIS.

BICYCLE-RACK.

SPECIFICATION forming part of Letters Patent No. 565,057, dated August 4, 1896.

Application filed September 9, 1895. Serial No. 561,894. (No model.)

*To all whom it may concern:*

Be it known that I, HENRY WESTPHAL, a citizen of the United States, residing at Chicago, in the county of Cook and State of Illinois, have invented certain new and useful Improvements in Bicycle-Racks, of which the following is a specification.

This invention relates to improvements in racks or stands to be used for supporting bicycles in an upright position and automatically locking them, so as to prevent their removal; and it consists in certain peculiarities of the construction, novel arrangement, and operation of the various parts thereof, as will be hereinafter more fully set forth and specifically claimed.

The objects of my invention are, first, to provide a rack for bicycles which shall be attractive in appearance, strong and durable, and effective in operation, yet simple and inexpensive in construction; and second, such a rack, in which the bicycle is automatically locked and held in an upright position.

In order to enable others skilled in the art to which my invention pertains to make and use the same, I will now proceed to describe it, referring to the accompanying drawings, in which—

Figure 1 is a perspective view of my rack, showing a bicycle locked therein. Fig. 2 is a vertical sectional side view showing the parts in their normal position and the rack ready to receive a bicycle. Fig. 3 is a rear vertical sectional view of the casing of the frame, showing the operating-bars in position and the supporting-frame removed. Fig. 4 is a perspective view of the securing-latches detached from the frame. Fig. 5 is a rear vertical sectional view of the lower portion of the casing of the main or supporting frame, showing by dotted lines the manner of disconnecting the operating-bars from the platform. Fig. 6 is a view in elevation of the lock with one of the plates of the casing thereof removed, showing the key locked in and a portion of the operating-bar of the rack to engage the lock. Fig. 7 is a view in elevation of the lock with one of the plates of the casing thereof removed, showing the position of the parts when the key is removed. Fig. 8 is a plan sectional view taken on line 8 8 of Fig. 6. Fig. 9 is a like view taken on line 9 9 of Fig. 7. Fig. 10 is a perspective view of the lock with one of the plates of the casing, the key-guide, stay, and tumblers removed; and Fig. 11 is a plan view of a portion of the top of the lock-casing, showing the keyhole.

Similar letters refer to like parts throughout the different views of the drawings.

A represents the side pieces constituting the main or supporting frame, and are made in ornamental designs, and usually semicircular, as shown in Figs. 1 and 2 of the drawings. These parallel side pieces are counterparts of one another, and have interposed in their lower horizontal parts a teeter or pivoted platform $A'$, upon which the wheel of the bicycle will rest when placed in the rack. Near the outer lower end of the pieces A is pivotally secured therebetween another and smaller platform $A^2$, which has its outer end inclined, as shown in Fig. 2 of the drawings, in order to provide a way for the wheel when it is being placed in the frame. The inner portion of the platform $A^2$ rests on the outer part of the platform $A'$.

To the upright and rear portion of the side pieces A is secured a casing B, which is preferably made rectangular in cross-section, and extends from the bottom of the side pieces to about their upper parts, and holds them a sufficient distance apart to admit of the insertion of the wheel. The face or front plate $b$ of the casing B is provided at its lower end with a vertical slot or opening $B'$, through which passes and operates the inner end of the platform $A'$, which engages the upright bar C, located within the casing B and movably held in position by means of a bracket $c$ and a pin $c'$, both of which are secured to the rear surface of the face or front plate $b$ of the casing, the pin $c'$ operating in a vertical slot $c^2$ in the said bar. The upper end of the bar C is enlarged, as at $c^3$, so as to afford a rest for the bar $C'$, which is also movably secured by means of brackets $c$ to the rear or inner surface of the face or front plate of the casing.

Near the upper end of the bar C, and to one side thereof, is fulcrumed a small lever $c^4$, having a knob $c^5$ on its outer end, which portion is passed through an opening $c^6$ in the side of the casing. This lever is employed to disconnect the lower bar C from the platform A', in order that it (said bar) may be dropped to the position shown by dotted lines in Fig. 5 of the drawings, in which position the upper bar C' will be free to fall or be lowered when released by the key from the lock located in the upper part of the casing, for it is obvious, by reference to Fig. 5 of the drawings, that by raising the knob $c^5$ to the position indicated by dotted lines the lever $c^4$ will force the bar C to one side and off the platform, when it will assume the position indicated by dotted lines in said figure, the said bar being pivoted and movably secured on the pin $c'$, in which position it will remain until the wheel is removed from the platform A', when the same will be lowered at its inner end and allow the bar to swing back into a vertical position over it.

While the bar C is in its lowered position, it is apparent that the bar C' will descend when released by the key to the lock, and that in its downward movement will revolve the latches and thus liberate the wheel.

Just above the upper end of the bar C the face or front plate $b$ of the casing is provided on its inner or rear surface with a tooth or catch $b'$, which engages a like tooth or catch $c^7$ on the lower part of the bar C', the upper end of which is provided with a projection or pin $c^8$ to engage the cam of the lock, as will be presently explained.

The rear surface of the bar C' is provided with a spring $c^9$, which contacts with the rear portion of the casing B and holds the said bar against the front or face plate of the casing and the teeth $c^7$ and $b'$ in engagement until they are disengaged by the pressure of the wheel on the lever $d$, which is secured at one of its ends to the outer surface of the face-plate of the casing, and is formed or provided with a pin $d'$ to pass through an opening $b^2$ in the casing to allow the said pin to contact with the sliding bar C' and to press it backward, thus releasing or disengaging the teeth $c^7$ and $b'$ and allowing the said bar to ascend, which operation is caused by the weight of the wheel, which rests on the platform A' and raises the inner end of the same, thus forcing the bars C and C' upward.

Just above the tooth $c^7$ the bar C' is formed or provided on each of its sides with lugs or catches $c^{10}$, which engage the arms $e$ on the inner ends of the latches E, which are provided at their outer portions or that portion farthest from the casing of the rack with round or curved arms E' to encircle the felly of the wheel. The latches E have their bearings at their inner ends in the casing, and at their outer ends in suitable plates or boxes $e'$ on the side pieces of the supporting-frame, and lie when in their normal position with the arms E' depending vertically, as shown in Figs. 2 and 3. The upper portion of the casing B is formed or provided with an enlargement or box $B^2$, within which is located a locking mechanism for securing the bar C' and the latches in a raised position. On top of the box $B^2$ is pivotally secured a cover $B^3$, which protects the key of the lock and prevents the same being reached without raising the bar C', which engages the lock. The cover $B^3$ is provided at its pivoted portion with an arm $b^3$, which extends into the box $B^2$ and engages a weighted dog $b^4$, pivoted to the front plate of the casing and which is prevented from dropping too far, so as to be out of engagement with the arm $b^3$, by means of a lug $b^5$ on the inner surface of the face-plate. When the bar C' is raised by reason of the weight of the wheel, the lower portion of the dog $b^4$ will also be lifted, as shown by dotted lines in Fig. 3 of the drawings, which operation will liberate the arm $b^3$ and allow the cover $B^3$ to be raised, so that the key T to the lock may be reached and the same operated so as to unlock the wheel.

The lock which I prefer to use, and which is herein illustrated, is of the same construction which is set forth and claimed in Letters Patent No. 532,506, issued to me on January 15, 1895, and consists of two plates $i\ i'$, the plate $i$ being formed with a vertical slot $l$ near its middle, which extends through the bottom of the casing, as shown, and having on its inner surface close to each of its ends the ribs $m\ m'$, both of which are formed with openings or recesses $m^2\ m^3$, in which the sliding bolts M M' operate, and are thereby guided in their backward and forward movements. The opening or recess $m^2$ is formed near the lower portion of the rib $m$, and the opening or recess $m^3$ near the upper end of the rib $m'$. Near their upper portions, and on their surfaces adjacent to the plate $i'$, each of the ribs $m$ and $m'$ is formed with recesses or mortises $m^4$ for the reception and operation of the spring-actuated tumblers N, which are formed with recesses $n\ n'$, the former of which engages with the stay O and the latter with the sliding rib or bead N' on the piece $N^2$, which unites the sliding bolts M and M', and is preferably formed in cross-section, as shown in Figs. 8 and 9, with two projections N' and $N^4$ at its edges extending in opposite directions, the flat piece $N^2$ being provided near its lower portion with a vertical slot $N^3$, in which fits and operates a pin or lug $p$ on the bifurcated cam P, which cam is pivotally secured to the plate $i$ at a suitable point near the outer portion of slot $l$ therein, as shown at $l'$. This cam is made, as clearly shown in Figs. 6, 7, and 10, with two prongs $r\ r'$, which form an open slot or fork $r^2$, into which will engage the lug or pin $c^8$ on the bar C'.

As shown in Figs. 6, 7, and 8, the tumblers N are pivotally secured, as at $o'$, on the rod $o^2$, having its bearings in the top and bottom of the casing near the farther end from the key-guide, and are provided with springs $o^3$, which are interposed between the tumblers and the plate $i'$, and they will be thus forced forward to engage with the bead or rib $N'$ on the sliding piece $N^2$.

Near the rib $m$ the casing is provided in its top and bottom with suitable circular openings $a$, through which is passed a split tube or key-guide S, which has its bearings for its lower end in the depending bracket $S'$ on the bottom of the lock-casing. The lower end of the key-guide S is provided with a spring $s^2$, which serves to revolve the key-guide, till the split therein, through which the projections $t$ on the key T pass to engage with the tumblers, into alinement with the openings $a^3$ therefor in the top of the casing, and is prevented from turning the guide too far by means of the lug or pin $s^4$, secured thereto, which is so placed that it will strike the bracket $S'$, which acts as a check.

The stay O, which is provided with a number of recesses $o^6$ to correspond with the number of projections $t$ on the key T, is rigidly secured in a vertical position and longitudinally with the lock-casing between the bead $N'$ and the key-guide and between the tumblers and the piece $N^2$. This stay is employed to regulate the combination of the lock, for it is obvious that the projections $t$ on the key must correspond in number and dimensions with the recesses in the stay, otherwise they would not pass through the same.

It is evident that the pin or projection $c^8$ on the bar $C'$ will extend into the slot $l$ of the plate $i$ of the lock and will engage with the open slot $r^2$ or fork between the prongs $r$ and $r'$ on the cam P, when the weight of the wheel on the platform $A'$, through the medium of the bar C, will lift the bar $C'$, provided, as before stated, with the projection or pin $c^8$, engaging with the prongs $r$ and $r'$, and will cause the cam P to be raised to the position indicated in Fig. 7, the movement of which cam, by means of its pin $p$, operating in the slot $N^3$ of the plate $N^2$, will cause the sliding bolts M and $M'$ and the bead $N'$, which are connected to the plate $N^2$ or made integral therewith, to be retracted to the position shown in Fig. 7, which operation removes the plate $N^2$ from interference with the projections on the shank of the key and thus permits the key-guide S to be partially revolved by means of the spring $s^2$ till the projections of the key are in alinement with the openings $a^3$ in the top of the casing, when, and not before, the key may be withdrawn and the operating-bar $C'$ will be securely locked in said position by reason of the engagement of the tumblers N with the bead $N'$.

In order to release or unlock the operating-bar $C'$, it will be necessary to replace the key in the key-guide, when by turning the same its projections will engage the tumblers and will free them from engagement with the bead $N'$, when by reason of the weight of the bar $C'$ and cam P they will be lowered, as shown in Fig. 6, which operation will interpose the plate $N^2$ between the projections on the key-shank and the opening $a^3$ in the top of the casing and prevent the key being removed.

Having thus fully described my invention, what I claim as new, and desire to secure by Letters Patent, is—

1. The combination with a rack or stand, of a pair of revoluble latches adapted to engage the wheel of a bicycle, a locking mechanism located on the rack, a sliding bar uniting the lock and latches and engaging the casing when in a lowered position, a lever secured to the casing and adapted to disengage the bar from the casing by the forward pressure of the wheel, and means for raising said bar and revolving the latches by the weight of the wheel, substantially as described.

2. The combination of a rack or stand, having a casing at its rear provided with a tooth or catch on its front plate, a lock within said casing, a pair of revoluble latches having their bearings in the casing and frame, a sliding bar uniting said latches and lock and provided with a tooth or catch to engage the catch on the casing and to hold said bar in a lowered position, a lever secured to the rack and adapted to disengage the bar from the casing by the forward pressure of the wheel, a mechanism to lift the bar and revolve the latches by the weight of the wheel, substantially as described.

3. The combination with a rack or stand composed of two parallel side pieces to hold the wheel between them in an upright position, and the casing B, at the rear of the rack provided with the tooth $b'$, on its face-plate, of a lock on the rack, a pair of revoluble latches having their bearings in the rack, a sliding bar $C'$, uniting said latches and lock and provided with a tooth or catch to engage the tooth on the casing, a lever secured to the rack and adapted to disengage the bar from the casing, the sliding bar C, movably secured on the rack and engaging at its upper end the bar $C'$, and the platform $A'$, pivoted in the lower part of the rack and adapted to raise said bars, substantially as described.

4. The combination with a rack or stand composed of the side pieces A, and casing B, having on its front plate the catch $b'$, of a lock on the rack, a pair of revoluble latches having their bearings in the rack, a sliding bar $C'$, uniting said lock and latches, and provided with a catch to engage the tooth or catch on the casing, a lever secured to the rack and adapted to disengage the bar from the casing, the sliding bar C, movably and pivotally secured on the rack and adapted to engage at its upper end the bar $C'$, the platform $A'$, pivoted in the lower part of the rack and adapted to engage the lower end of the bar C, and to raise the same as well as the bar $C'$, and the lever $c^4$, fulcrumed on the rack and adapted to disengage the bar C, and platform $A'$, substantially as described.

5. The combination of a rack or stand, with a lock on the rack, a pair of revoluble latches having their bearings in the rack, a connection uniting said latches and lock and extending to the lower portion of the rack, the platform A′, pivoted in the lower part of the rack and adapted to engage the connection uniting the latches and the lock and to raise the same by the weight of the wheel, substantially as described.

HENRY WESTPHAL.

Witnesses:
 CHAS. C. TILLMAN,
 E. A. DUGGAN.